J. E. FREY.
VERMIN TRAP.
APPLICATION FILED MAY 26, 1911.
1,020,690.
Patented Mar. 19, 1912.
3 SHEETS—SHEET 1.
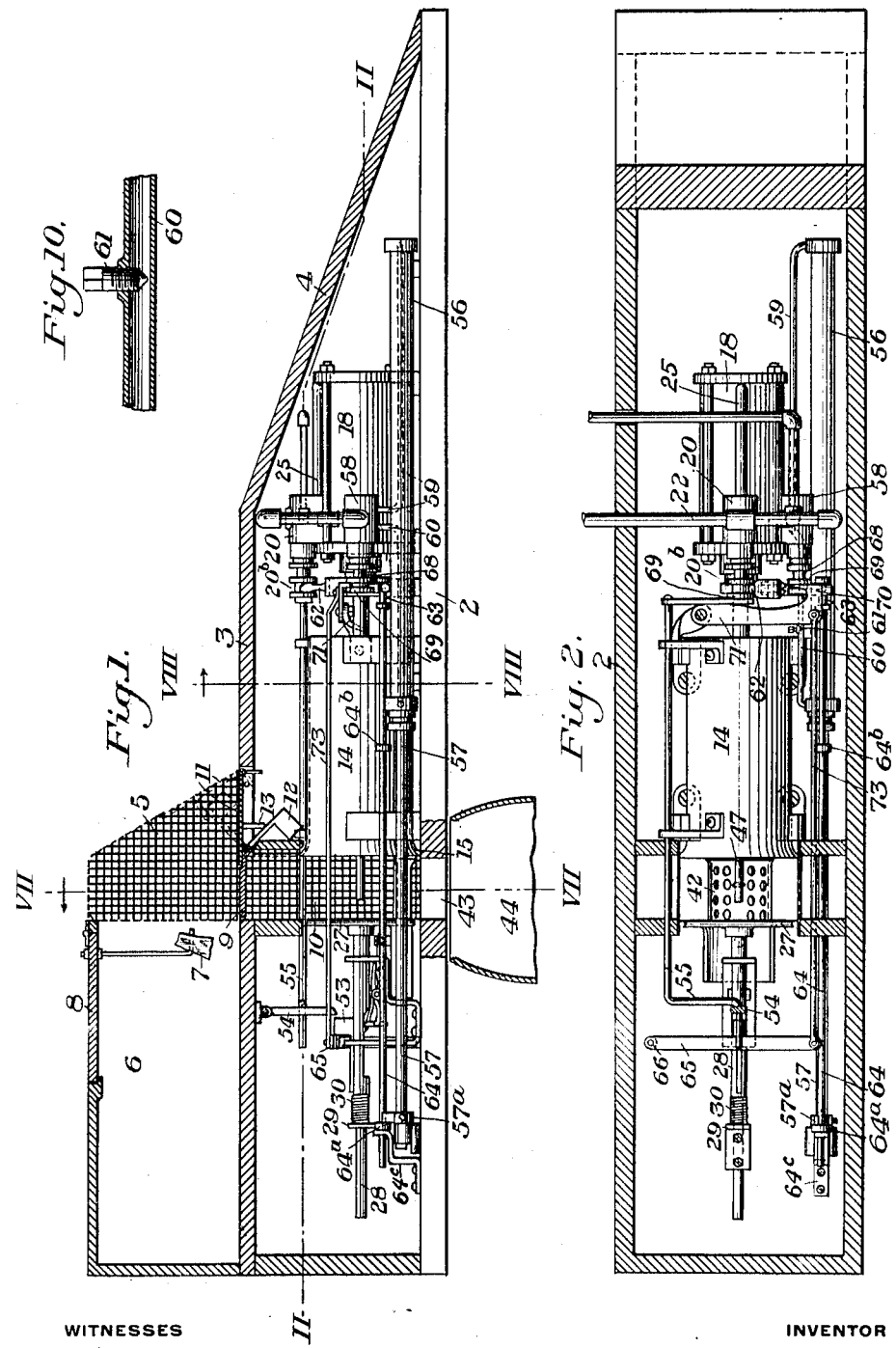
WITNESSES
INVENTOR
J. E. Frey J. E. FREY.
VERMIN TRAP.
APPLICATION FILED MAY 26, 1911.
1,020,690.
Patented Mar. 19, 1912.
3 SHEETS—SHEET 2.
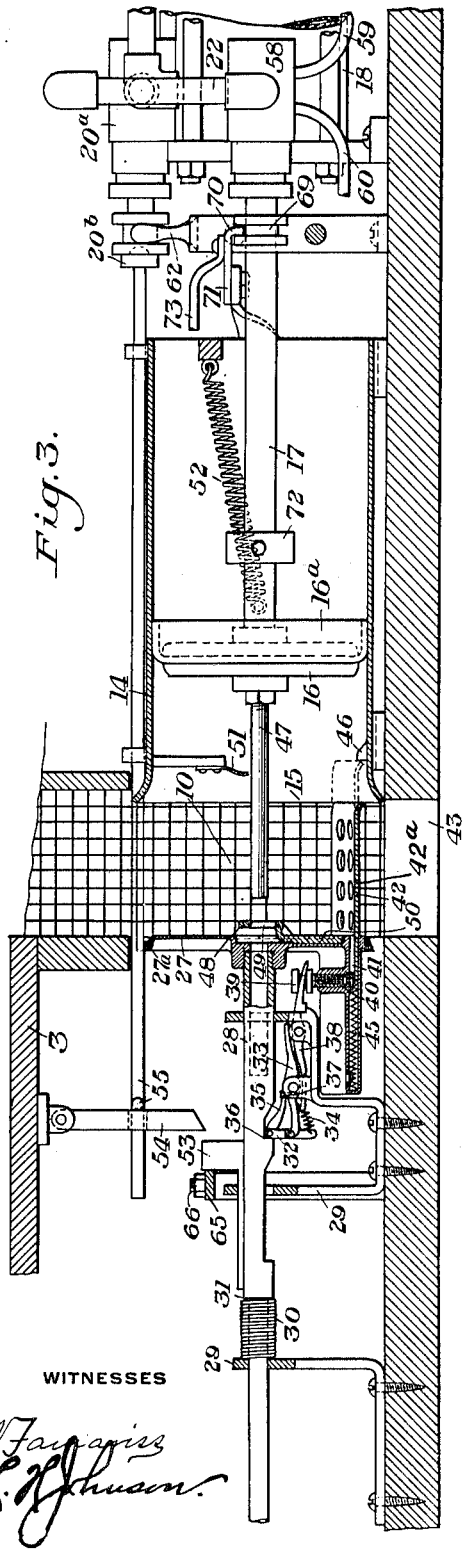
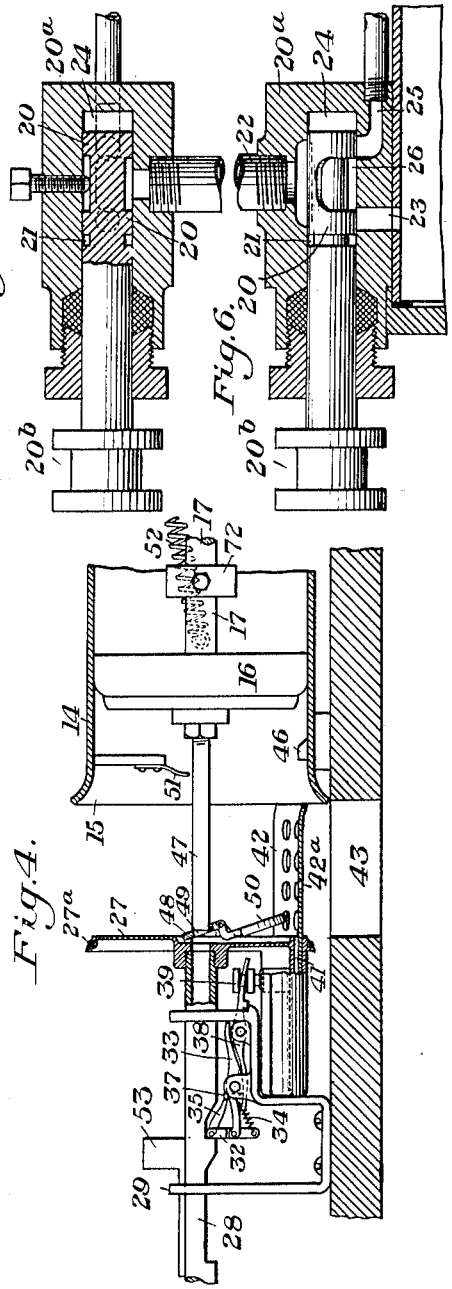
WITNESSES
INVENTOR
J. E. Frey J. E. FREY.
VERMIN TRAP.
APPLICATION FILED MAY 26, 1911.
1,020,690.
Patented Mar. 19, 1912.
3 SHEETS—SHEET 3.
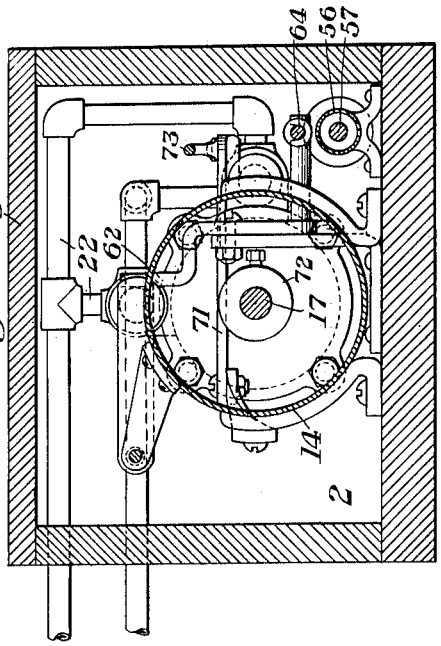
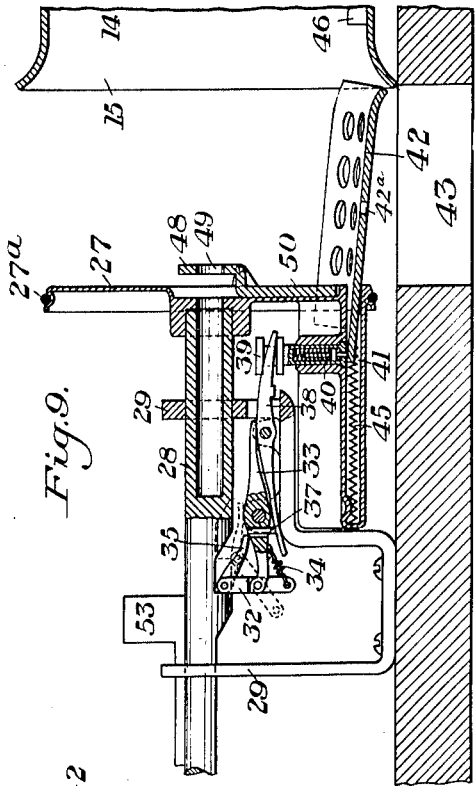
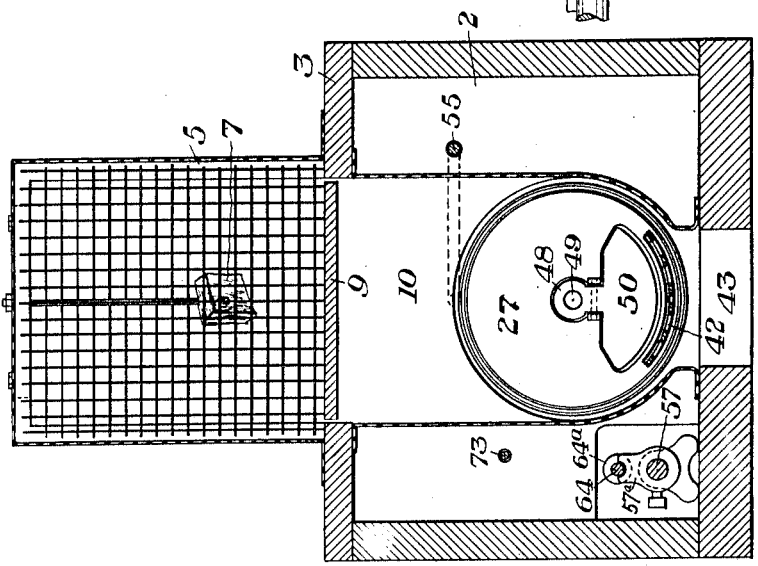
WITNESSES
INVENTOR
J. E. Frey

UNITED STATES PATENT OFFICE.

JOHN E. FREY, OF PITTSBURGH, PENNSYLVANIA, ASSIGNOR OF ONE-HALF TO BENJAMIN A. LAWS, OF PITTSBURGH, PENNSYLVANIA.

VERMIN-TRAP.

1,020,690.   Specification of Letters Patent.   Patented Mar. 19, 1912.

Application filed May 26, 1911. Serial No. 629,645.

*To all whom it may concern:*

Be it known that I, JOHN E. FREY, of Pittsburgh, Allegheny county, Pennsylvania, have invented a new and useful Vermin-Trap, of which the following is a full, clear, and exact description, reference being had to the accompanying drawings, forming part of this specification, in which—

Figure 1 is a longitudinal vertical section of one form of trap embodying my invention; Fig. 2 is a horizontal section on the line II—II of Fig. 1; Fig. 3 is an enlarged vertical section of a portion of the trap; Fig. 4 is a detail sectional view of the trip mechanism; Figs. 5 and 6 are respectively a sectional plan and a vertical section of one of the controlling valves; Fig. 7 is a section on the line VII—VII of Fig. 1; Fig. 8 is a section on the line VIII—VIII of Fig. 1; Fig. 9 is a detail sectional view; and Fig. 10 is a detail view of the regulating valve.

My invention has relation to vermin traps, and is designed to provide a trap of this character which will operate automatically to kill the animal after it has been trapped; and which will automatically eject the dead animal and will automatically reset itself.

My invention comprises a vacuum or exhaust chamber, means for getting the animal into said chamber, means for then exhausting or rarefying the air in the chamber to thereby kill the animal by suffocation, and means for then ejecting the animal and resetting the trap.

Referring to the accompanying drawings, the numeral 2 designates a casing which incloses the operative parts of the trap, and which has a flat top 3 which is approached by an inclined runway 4. The flat top 3 has a caged portion 5 partially open at the front, and communicating at its rear end with an upward extension 6 of the casing which forms a bait chamber.

7 designates a piece of bait which is suspended within this chamber from a movable cover section or door 8. The floor of the cage portion 5 consists of a downwardly movable pivoted trap door 9 below which is a closed trap space or well 10, and an upwardly movable floor section 11. The trap door 9 has a counterweight 12, and when the door moves downwardly this counterweight moves upwardly into contact with the depending projection 13 on the under side of the upwardly movable floor section 11 and thereby forces said section upwardly into the position shown in dotted lines in Fig. 1. In this position said floor section not only closes the entrance to the cage, but its movement deprives the animal of any support, and causes it to be precipitated into the trap space 10.

Placed within the casing 2 in front of the trap space 10 is a cylinder 14 having the flared rear end portion 15. 16 is a piston working in said cylinder and having a piston rod 17 which extends forwardly through the front end of the cylinder and into a motive cylinder 18, in which it carries the usual piston (not shown). The motive cylinder which is shown is a double-acting cylinder, arranged in the present instance to be operated by water pressure. It is provided with an inlet valve 20 (shown in detail in Figs. 5 and 6) and which controls by a port 21 the flow of liquid from a supply pipe 22 into a port 23 leading to the rear end of the cylinder; and by a port 24, the flow of liquid into a passage 25 leading into the front end of the cylinder. This valve also controls the exhaust port connection 26. The operation of this valve will be hereinafter described. The rear side of the trap space 10 is formed by a movable cylinder head 27, which is secured to a longitudinally movable rod 28 mounted to slide in suitable supports 29.

30 is a helical spring which is seated around the rod 28 between the shoulder 31 thereof and one of the supports 29. This spring is normally under compression, being held in this condition by a pivoted latch 32. This latch 32 is pivoted to a lever 33, and is provided with a spring 34 and dog 35. The dog 35 acts to normally hold the latch 32 in engagement with the shoulder 36 of the rod 28 against the action of the spring 34, by its engagement with a pin 37 mounted on a pivoted lever 38 and projecting upwardly through an opening in the lever 33. The lever 38 has a forwardly projecting forked arm which engages the grooved head 39 of a spring-pressed vertically movable pin 40, which projects at its lower end into a slideway 41.

The bottom of the trap space 10 consists of a rearwardly movable slide plate 42, which normally closes an opening 43 over a barrel or other suitable receptacle 44. This slide plate 42 is arranged to move rearwardly into the slideway 41 against a spring 45, which is placed in the slideway. The interior of the cylinder 14 has a lug 46 for engagement with the front edge of this plate 42. The piston 16 is provided with suitable peripheral packing 16$^a$; and the movable cylinder head 27 is also provided with a suitable peripheral packing 27$^a$, so that when it is moved forwardly into the flared end portion 15 of the cylinder 14, it will form a practically air-tight joint therewith. The piston 16 is also provided with a rearwardly projecting tail rod 47, which is adapted to telescope through the cylinder head 27 and into the rod 28, which is made hollow for this purpose. This rail rod 47 is also adapted to move the piston head 27 back to its normal reset position, in the manner hereinafter described; and for this purpose it is necessary to provide means for preventing its telescoping within the rod 28. The means which are shown for this purpose consist of a pivoted plate 48, having an opening 49 therethrough which is normally held in line with the opening of the rod 28 by means of the depending weight 50. The plate 48 when moved forwardly into the cylinder 14 is adapted to contact with the projection 51 within said cylinder.

52 is a spring, which is connected to the piston rod 17 for the purpose hereinafter described.

The rod 28 is provided with a projection 53, which, when the rod is moved forwardly is arranged to contact with the lower beveled end of a depending pivoted arm 54. This arm 54 engages the bend (see Fig. 2) of a tappet rod 55, which extends forwardly to the valve cage 20$^a$ of the valve 20, and is designed to contact with a head 20$^b$ on the end of the stem of said valve 20.

56 designates a comparatively long cylinder which is shown as located at one side of the cylinders 14 and 18, and which is provided with a piston having the rearwardly projecting rod 57. The cylinder 56 is a double-acting cylinder, and is controlled by a valve similar to the valve 20, and which is placed in a valve cage 58. From this cage 58 a pipe 59 leads to the front end of the cylinder 56 and another pipe 60 to the rear end of said cylinder. The pipe 60 is provided with a suitable regulating valve 61, one form of which is shown in detail in Fig. 10. The head 20$^b$ of the stem of the valve 20 is engaged by one arm of a lever 62, whose other arm has a lost motion engagement at 63 with a longitudinally movable shifting or tappet rod 64 which extends rearwardly over the piston rod 57 and is supported at its rear end in a bearing 64$^c$. This rod 64 carries the two collars 64$^a$ and 64$^b$ which are arranged to be engaged by a lug 57$^a$ fixed on the piston rod 57, the engagement between said lug and the collar 64$^b$ taking place when the rod 57 is near the limit of its forward stroke; and the engagement with the collar 64$^a$ taking place when the rod 57 is near the limit of its backward stroke. The valve which controls the cylinder 56 has a projecting stem 68 with a grooved head 69 engaged by the fork 70 of a pivoted lever 71, which is in position to be operated by a collar 72 on the piston rod 17. Connected to the lever 71 is a link 73, which is connected at its opposite end to a lever 65, pivoted at 66, and is arranged to be operated by the projection 53 on the rod 28.

When the animal has been precipitated into the trap space 10 by the dropping of the trap door 9, in the manner before described, it falls upon the slide plate 42, thereby rocking said plate into the position shown in Fig. 9. This movement of the plate 42 causes its rear end to engage the lower end of the spring-pressed pin 40 and forces the latter upwardly. This raises the forward arm of the lever 38, and depresses its rear arm to withdraw the pin 37, and thereby free the dog 35 of the latch 32. The latch 32 is now free to move under the action of its spring 35 and release the rod 29, which is shot forwardly by the action of the spring 31. The movable cylinder head together with the animal is carried forward into the rear end of the cylinder 14, the rod 28 telescoping over the tail rod 47 of the piston 16, and the plate 48 coming into contact with the projection 51. Owing to the fact, however, that the plate 27 is encircling the tail rod 47, the contact with the projection 51 has no effect upon said plate at this time. The forward movement of the rod 28, through its action on the lever 54 moves the tappet rod 55 forwardly into engagement with the head 20$^b$ of the valve 20, and thereby shifts said valve to admit fluid to the rear end of the motive cylinder 18 through the port 21 of the valve 20. This cylinder now commences to act, and the piston 16 is drawn forwardly within the cylinder 14 and thereby creates a partial vacuum in the exhaust space or chamber between the piston and the movable cylinder head 27. In this manner the air in said chamber is rarefied to such an extent that the animal can live but a short time. As soon as the piston 16 reaches the limit of its forward movement, the collar 72 on the piston rod 17 engages the lever 71, and thereby actuates the valve stem 68 to shift the valve which controls the cylinder 56 to a position to admit liquid to the rear end of the cylinder 56. The regulating valve 61 is set to admit water slowly to the rear end of this cylinder, whose piston now commences to move forwardly and continues such movement until the projection 57ᵃ on the piston rod 57 engages the collar 64ᵇ on the shifting rod 64. When this occurs, said shifting rod is moved forwardly to thereby move the lever 62 to shift the valve 20 and reverse the action of the motive cylinder 18.

By the regulation of the valve 61, any desired length of time may be made to lapse before the action of the motive cylinder 18 is reversed, thus insuring the retention of the animal in the exhaust chamber for such a length of time as will insure its death. The piston 16 in moving forwardly withdraws its tail rod 47 from the plate 41, and the projection 51 then causes said plate to move into the inclined position shown in Fig. 4. When the cylinder 18 is reversed in the manner described, the piston 16 moves backwardly in the cylinder 14 until the tail rod 47 engages the plate 48; and by its engagement with said plate moves the cylinder head 27 back to its former position and compresses the spring 31. The slideway 41, together with the locking pin 40 is attached to the head 27, and during the forward movement of the head 27 before described, the slide plate 42 contacts with the projection 46 and forces said plate backwardly into the slideway against the action of the spring 45 until a position is reached in which the spring locking bolt 40 engages a perforation 42ᵃ in said plate and locks it in its retracted position. When the head 27 is moved backwardly by the reversal of the piston 16, the grooved head 39 of the pin 40 engages the fork of the lever 38, and said pin is thereby raised out of engagement with the perforation 42ᵃ and the spring 45 returns the plate 42 to its normal position. The engagement of the head of the pin 39 with the lever 38 also sets the latch 35 in position to catch and retain the rod 28. The trap is now reset. The return movement of the rod 28 causes the projection 53 to engage the lever arm 65 and thereby move the link 73 to actuate the lever 71 to reverse the valve in the casing 58. The water now enters the front end of the cylinder 56 through the pipe 59; and the rearward movement of the piston rod 57 brings the projection 57ᵃ into engagement with the collar 64ᵃ on the shifting rod 64, and thereby moves said rod rearwardly. This actuates the lever 62 and throws the valve 20 to central position. In this central position, as shown in Figs. 5 and 6, there is a slight leakage past the valve 20 so that the spring 52 can slowly draw the piston 16 forwardly to the set normal position shown in Fig. 3. This completes the cycle of operations, which cycle is repeated for each animal and trap. The rearward movement of the piston 16 and the reversal of the cylinder 18 forces the dead animal out at the rear end of the cylinder 14 and down through the opening 43 into the barrel 44 or other receptacle.

My invention provides a vermin trap adapted to the catching and killing of rats and similar animals, which is wholly automatic in its action, each animal being killed after being entrapped, the dead animal being then ejected from the trap and the trap reset ready for another animal.

It will be obvious that many changes can be made in the details of construction and arrangement of the parts. Thus, instead of employing a hydraulic motor for creating a rarefaction of air in the death chamber of the trap, various other kinds of motors may be employed. Various changes may also be made in the controlling devices for the motor and in other details of the parts.

I claim:—

1. A vermin trap having a death chamber, means for getting the animal into said chamber, and means set in operation by the entrance of the animal to said chamber for then producing a rarefaction of the air in said chamber; substantially as described.

2. A vermin trap having a death chamber, means for getting the animal into said chamber, and means for then producing a rarefaction of the air in said chamber, together with means set in operation by the entrance of the animal into said chamber for subsequently ejecting the dead animal from said chamber; substantially as described.

3. A vermin trap having a death chamber, means for getting the animal into said chamber, means actuated by the animal for then closing the chamber, and for subsequently producing a rarefaction of the air in said chamber; substantially as described.

4. A vermin trap having a death chamber, means for getting the animal into and inclosing it within the chamber, a piston therein to effect a rarefaction of the air in said chamber, a motor for actuating the piston, and means actuated by the animal for actuating the motor; substantially as described.

5. A vermin trap having a death chamber, a trap space adjacent to said chamber, means for getting the animal into said space, a closure for the chamber, trip mechanism actuated by the animal when in said space for causing the entrance of the animal to the chamber and the closure thereof, means for effecting a rarefaction of air in said chamber, a motive device for said means, and means for automatically actuating the motive device to produce a rarefaction of the air within said chamber; substantially as described.

6. A vermin trap having a death chamber, means for closing said chamber, a piston therein, a motor, a control device for the motor, another motive device for reversing the action of the said control device, and means initially operated by the animal for effecting the operation of said parts and their control; substantially as described.

7. A vermin trap having a normally open death chamber, a trap space adjacent to said chamber, a movable closure for said chamber forming the rear wall of said space, trip mechanism in said space for controlling the closing movement of the closure, a motive device for rarefying the air in said chamber, and means actuated by the movable closure for controlling the actuation of the motor; substantially as described.

8. A vermin trap comprising a cylinder having a movable head and a movable piston, motive device for the piston, means actuated by the entrance of the animal in the trap to actuate the head to force the animal into the cylinder and to close the cylinder and for then actuating the motive device; substantially as described.

9. A trap having a death chamber, a trap space forming a continuation of one end of said chamber, a movable piston forming the other end of the chamber, a movable closure for the open end of the chamber and forming a wall for said space, means for getting the animal into said space, a motive device for the cylinder, and means actuated by the entrance of the animal to said space for actuating said closure and also the motive device; substantially as described.

10. A vermin trap having a death chamber, a motive device for producing a rarefaction of air in said chamber, trip mechanism for controlling the operation of the motive device, and means for automatically reversing the action of the motive device after a given period of time; substantially as described.

11. A vermin trap having a death chamber, a motive device for producing a rarefaction of air in said chamber, trip mechanism for controlling the operation of the motive device, and means for automatically reversing the action of the motive device after a given period of time, together with means for controlling the length of such time period; substantially as described.

12. A vermin trap comprising a cylinder having a piston therein, a motive device for actuating the piston, a movable closure for one end of the cylinder, means for getting the animal into the space between the closure and the cylinder piston, and means for actuating the closure to close the cylinder, trip mechanism controlled by the entrance of the animal in said space, and controlling the closure-actuating means and also the motor starting device, means effected by the motion of the piston for causing a reversal of its movement, and means whereby the return movement of the piston is caused to restore the closure and its trip mechanism to their normal set positions; substantially as described.

In testimony whereof, I have hereunto set my hand.

J. E. FREY.

Witnesses:
A. F. TIBBETTS,
L. H. JOHNSON.